June 6, 1950  E. V. CALDWELL ET AL  2,510,168
ANIMAL TRAP
Filed Nov. 13, 1945
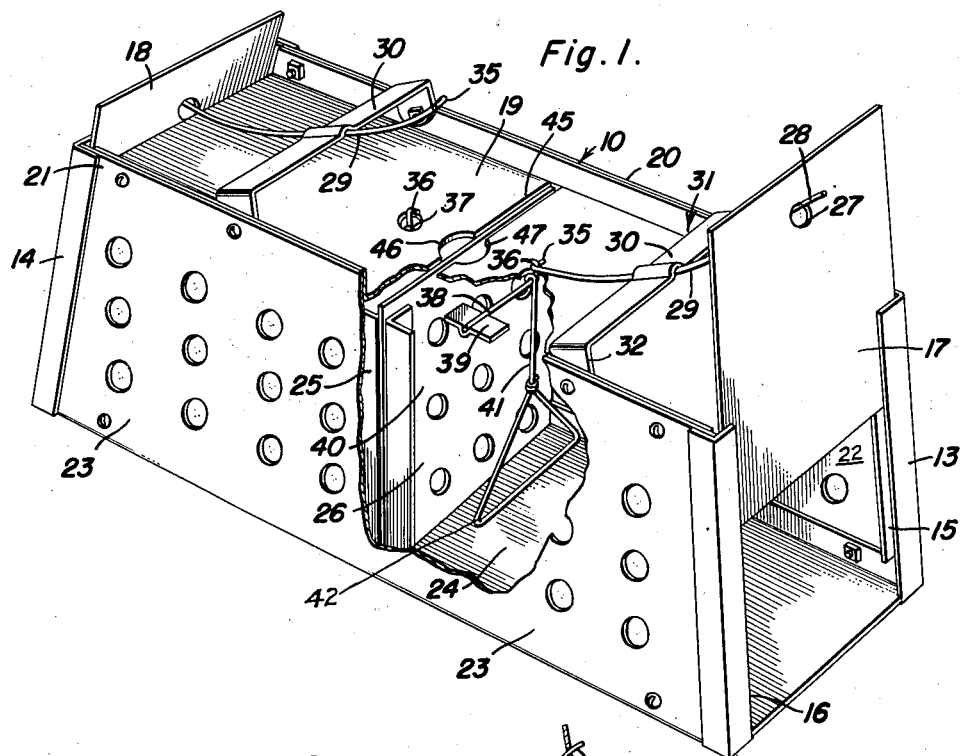
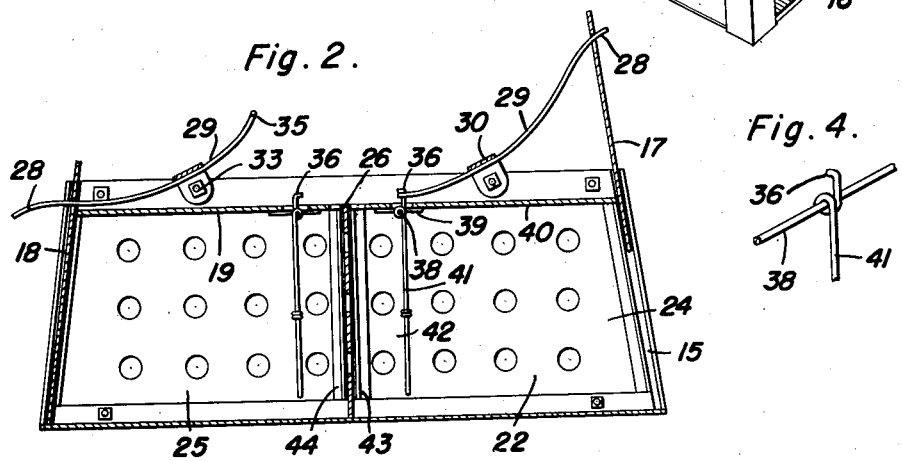
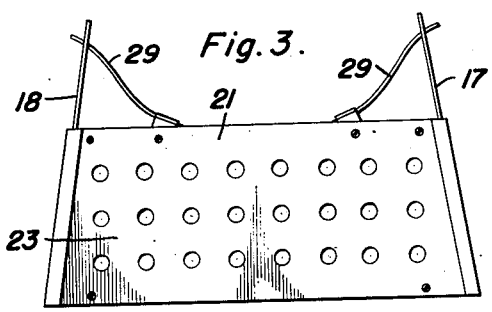
Inventors
Emery V. Caldwell
Maxine Marshall
By Clarence A. O'Brien
and Harvey B. Jacobson
Attorneys Patented June 6, 1950

2,510,168

UNITED STATES PATENT OFFICE 2,510,168

ANIMAL TRAP

Emery V. Caldwell and Maxine Marshall,
Flint, Mich.

Application November 13, 1945, Serial No. 628,137

1 Claim. (Cl. 43—61)

Our invention relates to improvements in traps and has for its object to provide a novel trap door release.

A further object of our invention is to provide a double trap having gravity actuated sliding trap doors and a novel release for the doors.

Another object of the invention is to provide an all metal trap which may be occasionally fired to destroy odors which often scare animals away from the trap.

Other features and advantages will become more readily apparent from the following description and the accompanying illustrative drawings in which:

Figure 1 is a perspective view of our trap, parts being broken away,

Figure 2 is a longitudinal vertical sectional view of the trap,

Figure 3 is a reduced side elevation of the device shown in set position, and

Figure 4 is an enlarged fragmentary detail view, in perspective, of the trigger and parts associated therewith.

In the above drawings as well as in the specification to follow, the same characters of reference indicate the same parts throughout.

Our invention consists of a trap 10, the body portion 11 of which is formed of perforated sheet metal and has both ends 13 and 14, each with opposing trackways 15 and 16 for vertically sliding doors 17 and 18. As the control mechanism of each door is identical it will be necessary to detail but one of them which will be done a little later on.

The top wall 19 of the body 11 is countersunk below the upper edges 20 and 21 of the side walls 22 and 23. The body is divided into two separate compartments 24 and 25 by a center division wall 26. The door 17 has an aperture 27, through which an end 28 of a lever 29 projects. The central portion of the lever is fixed to the cross-head 30 of an inverted U-shaped rocker 31, the depending arms 32 and 33 of which are pivotally connected to the said edges 20 and 21 of the side walls. The inner terminal 35 of the lever 29 is turned at right angles thereto for engagement by the trigger 36, projecting through an aperture 37, in said top wall 19, and which is pivotally connected to a supporting bar 38, carried by a grooved leaf 39, fixed to the inner surface 40 of the wall 19. The said trigger is the outer end of a wire bar 41, which swings down into the chamber 24, and terminates at its lower end in a bait holder 42. When the trigger 36 is engaged over the terminal 35, the bait holder is held on so that the least push upon the bait will release the trigger and the door 17 will drop.

The wall 26 is slidably held between angle irons 43 and 44, and is removable through the transverse slot 45 in said top wall 19. Enlargements 46 and 47 of said slot provide means for finger engagement with the upper edge, of the division wall, whereby it may be conveniently removed when desired, and also means whereby the trap may be carried by a finger of a user.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described our invention that which we claim as new and desire to procure by Letters Patent is:

The described trap comprising a body member open at both ends and having side walls with portions extending above a flat top, gravity actuated slide doors for each of said ends and a wall dividing the body into two compartments, said doors having apertures near the upper edges thereof, levers projecting through the apertures, rockers pivoted on said extending portions upon which the levers are mounted, triggers adapted to engage the levers and pivoted on said top, said triggers depending into said compartments and being disengageable from said levers when the depending portions of the triggers are pushed toward said dividing wall, bait holders connected with the triggers, said top section having a hole through which the triggers project, said levers remaining in engagement with said doors in all positions thereof to facilitate re-setting of the trap, and spaced vertical guide rails secured to the inside surfaces of said side walls intermediate the ends thereof to retain said dividing wall, said top having a transverse slot above said dividing wall, a part of which slot is larger than the adjacent portion of the slot to allow insertion of the fingers of an operator to remove said dividing wall.

EMERY V. CALDWELL.
MAXINE MARSHALL.

REFERENCES CITED

The following references are of record in the file of this patent:

UNITED STATES PATENTS

| Number | Name | Date |
|---|---|---|
| 74,264 | Zaiser | Feb. 11, 1868 |
| 107,647 | Bachman | Sept. 27, 1870 |
| 556,266 | Harvey | Mar. 10, 1896 |
| 1,267,159 | Zuckermann | May 21, 1918 |
| 1,474,096 | Sorensen | Nov. 13, 1923 |
| 1,554,079 | Frick | Sept. 15, 1925 |
| 1,759,048 | Fisher | May 20, 1930 |
| 2,155,544 | Harlow | Apr. 25, 1939 |

FOREIGN PATENTS

| Number | Country | Date |
|---|---|---|
| 579,696 | France | Apr. 2, 1924 |
| 447,527 | Germany | Apr. 28, 1928 |